UNITED STATES PATENT OFFICE.

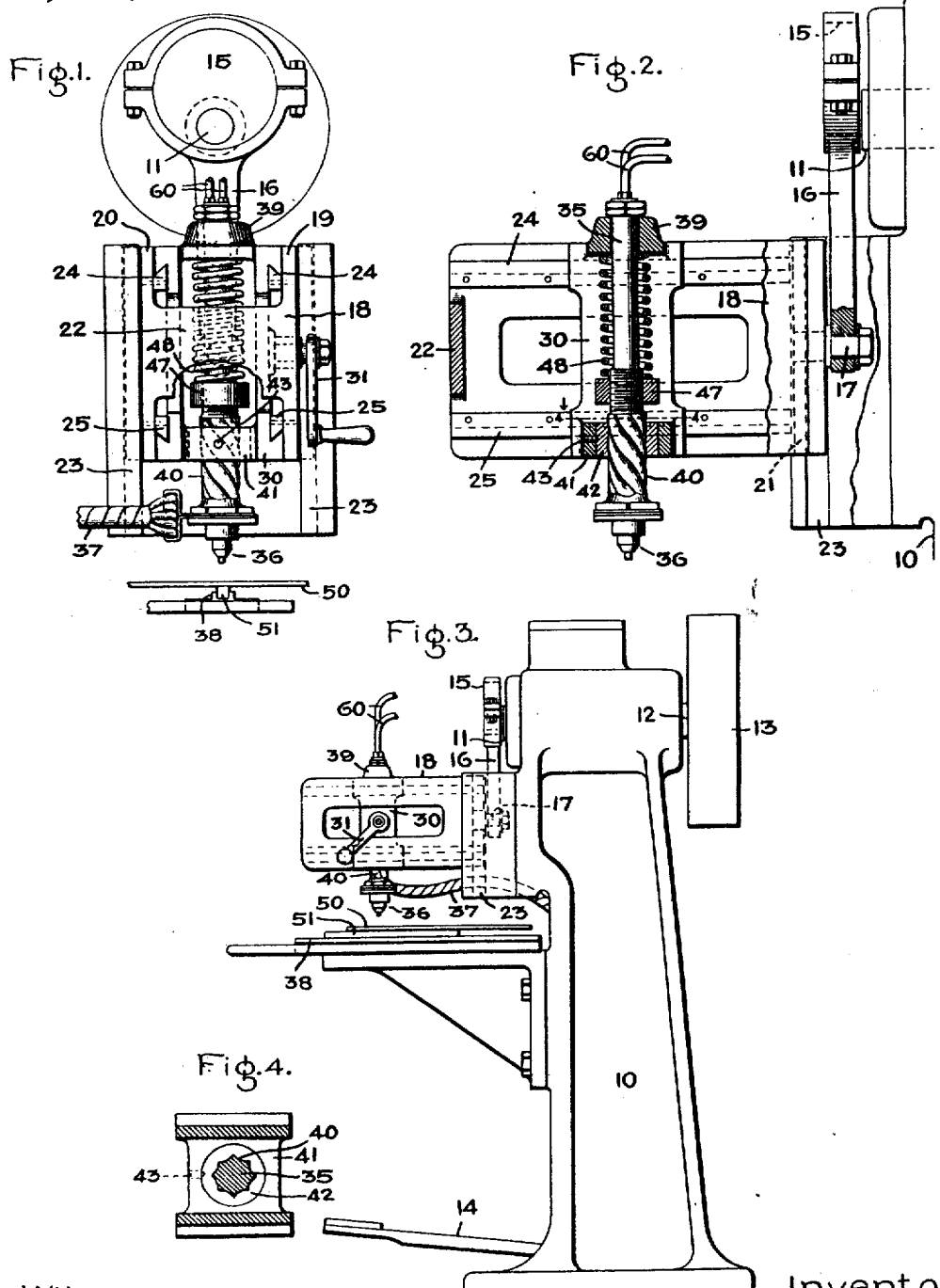

HENRY GEISENHÖNER, OF SCHENECTADY, NEW YORK, ASSIGNOR TO GENERAL ELECTRIC COMPANY, A CORPORATION OF NEW YORK.

ELECTRIC WELDING.

1,242,171.     Specification of Letters Patent.     Patented Oct. 9, 1917.

Application filed March 16, 1915. Serial No. 14,717.

*To all whom it may concern:*

Be it known that I, HENRY GEISENHÖNER, a citizen of the United States, residing at Schenectady, in the county of Schenectady, State of New York, have invented certain new and useful Improvements in Electric Welding, of which the following is a specification.

My invention relates to electric resistance welding by roller, point and analogous electrodes as distinguished from butt welding of rods and bars held in clamps; it particularly relates to electric resistance spot welding.

One object of my invention is to improve the method of welding whereby the effects of scale, dirt, etc., between the work and an electrode in opposing the welding is overcome, and whereby the welding metal is worked while in a softened condition, or either of these. These improvements in the method of welding consist in addition to the methods usually followed, in moving one or more of the electrodes on the work at a point of union to break or remove the scale, dirt, etc., and also moving one or more of the electrodes on the work at that point while the work is in a softened condition to urge the intermixing of the metals.

Another object of my invention is to provide an improved electric resistance welding machine for the class of operations to which my invention relates. This machine is particularly adapted to carry out the improved method of welding of my invention and for making a plurality of more or less contiguous spot welds.

In the accompanying drawing and following description I have illustrated and described a spot welding machine embodying, and suitable for carrying out the method of operation of, my invention. Figure 1 is a front elevation of the parts of this machine pertinent to my invention. Fig. 2 is a side view, partly in section, of the parts of Fig. 1. Fig. 3 is a side elevation of the welding machine. Fig. 4 is a section of a detail on the line 4—4 of Fig. 2 in the direction of the arrows.

This welding machine consists of the body portion 10 which may contain the usual transformer (not shown) for stepping down the voltage; in the upper part of the body portion is a shaft 11 which may be driven in any suitable way, as through a clutch to the shaft 12, which in its turn may be driven constantly by a belt over the wheel 13. The foot lever 14 may operate the clutch so that the shaft 11 is rotated as desired to engage the movable electrode with the work and remove it therefrom, as will be later described, and this lever may also operate the switch (not shown) for connecting and disconnecting the transformer to and from the source of energy or the switch may be operated manually or in any other desired way.

On the shaft 11 is mounted the eccentric 15 connected by the arm 16 to the pin 17 of the welding head. The welding head 18 comprises two side members 19 and 20, joined at their ends by the end members 21 and 22, forming a sort of box open at the top and bottom. This head 18 is arranged to slide up and down in the guideways 23 fastened to the body of the machine under the control of the eccentric 15. Each of the side members of the head carries an upwardly facing guide 24 and a downwardly facing guide 25. Upon these guides is carried an electrode carriage 30 which may be moved thereon toward and from the body of the machine by the handle 31 within ready reach of the operator. The electrode holder 35 carried by the electrode carriage 30, directly carries the operating electrode 36 attached for example by screw threads to its lower end. Pipes 60 which may be flexible or have flexible connections, carry water to and from passages through the electrode carrier 35 to cool the electrode. A cable 37 connects the electrode carrier 35 to one side of the secondary of the transformer (not shown); the other side of the transformer is connected to the coöperating electrode of the table 38. The table 38 which forms or carries the coöperating electrode, is carried on the body 10 below the head 18 and so that the work thereon is within reach of the electrode 36. The upper end of the electrode carrier 35 is round in cross section and is mounted to slide and rotate freely through the upper cross member 39 of the electrode carriage 30. The lower portion of the electrode carrier 35 is provided with high pitch screw threads, as indicated at 40; these screw threads work in coöperating screw threads in the lower cross member 41 of the electrode carriage 30. In this case these coöperating screw threads are formed within a member 42 carried by the cross member 41, held in its place by the set screw 43. Fig. 4 illustrates this portion of the device in cross section. The electrode carrier 35 is also provided with a collar 47 between which and the member 39 of the electrode carriage is mounted a spring 48 surrounding the electrode carrier 35. The collar 47 is screw threaded to the carrier 35 and may be adjusted in position thereon. As will be apparent, this spring 48 tends to force the electrode 36 toward the work, but the electrode 36 may be forced back against the spring, the electrode carrier 35 and the electrode 36 rotating however under the influence of the screw threads at 40 and coöperating screw threads in the member 42; further, the electrode carrier 35 and the electrode 36 rotate in the reverse direction whenever the electrode holder is again moved outward by the spring 48.

I have illustrated certain work in position on the table 38. This work comprises a sheet of metal 50 and a bar 51 to be spot welded thereto.

The operation of this device is as follows: The work and the machine being in the positions illustrated in Fig. 3, and with the shaft 12 being driven, water flowing through the pipes 60 to and from the electrode carrier and energy available for the transformer, the operator depresses the foot lever 14. This engages the clutch between the shaft 11 and shaft 12, causing the latter to rotate the former. As the shaft 11 is rotated, the eccentric 15 forces the head 18 downward toward the work. The electrode 36 and head 18 remain in the same relative positions until the electrode 36 reaches the work which is prior to the time when the head 18 reaches the lowermost point of its travel. As the electrode contacts the work, it is forced backward into the head against the tension of the spring 48 and is rotated under the influence of the coöperating screw threads as before indicated. This rotation of the electrode 36 cracks or disturbs the scale or dirt, or other foreign substances between the electrode 36 and the work, and reduces the obstructions they tend to offer to the passage of current between the electrode and the work. The spring 48 has such tension with the head 18 near its lower position, as to exert the proper welding pressure on the electrode 36; this pressure may be adjusted by rotating the collar 47. Sometime while the electrode 36 is in contact with the work, and preferably at least after this electrode has begun its rotation, current is supplied to the electrodes and passed between them through the work to develop the requisite heat. As the work softens under the passage of the current between the electrode 36 and the coöperating electrode 38, the spring 48 forces the electrode 36 somewhat into the work, but this outward movement of the electrode 36 is likewise accompanied by its rotation as before explained. This rotation of the electrode 36 works the metals, tending to cause their intermingling something after the fashion in which the metals are caused to intermingle by hammering when welding by an open fire. While these operations have been going on, the shaft 11 has been continuing its rotation and does continue its rotation until it finally withdraws the head 18 and the electrode 36 from the work. The clutch may be so arranged that a single depression of the foot lever 14 causes a single depression of the welding head 18, or the welding head 18 may continue its up and down movement so long as the foot lever 14 is maintained in its lower position. This is immaterial to my invention. When the union below the electrode 36 (as illustrated in Fig. 3) is finished, the operator slides the carriage 30 along the head 18 until the electrode 36 is over another point of desired union when the above described operations are repeated. He may thus weld a number of adjacent points with minimum effort by merely moving the carriage 30 in the welding head 18.

In the above description, I have not gone into the complete details of the method of operating, for example, the times of application and removal of the pressure relative to the beginning and the ending of the supply of current to the work; these details are all more or less immaterial to my present invention. The improvements of my method of operation are applicable to substantially all of the prior methods of electric resistance welding by means of electrodes. They reside generally in the moving of the electrode on the work at a point to be welded at the beginning of the welding operation to break or disturb the scale or other foreign substances between the electrode and work, and moving the electrode on the work at that point while the work is in a softened condition to aid the intermingling of the metals of the work. As will be apparent, either of these new steps or improvements in the method of operation may be used without the other (so far as the method portion of my invention is concerned), or both may be used together as in the machine I have hereinbefore described.

While I have described the principle of my invention and the best mode I have contemplated for applying this principle, other modifications will occur to those skilled in this art and I aim in the appended claims to cover all modifications which do not involve a departure from the spirit and scope of my invention.

What I claim as new and desire to secure by Letters Patent of the United States is:—

1. The method of electric resistance welding which consists in engaging an electrode with the work, moving said electrode on the work at a definite point and, after discontinuing said movement, passing current through the electrode into the work at that point.

2. The method of electric resistance welding which consists in pressing an electrode on the work at a point to be welded, and, while continuing such pressure, both moving said electrode on the work at that point and, after discontinuing said movement, passing current through the electrode into the work.

3. The method of electric resistance welding which consists in pressing an electrode on the work at a point to be welded, and, while continuing such pressure, passing current through the electrode into the work with the electrode at rest relatively to the work, and later moving said electrode on the work at that point while the work is in a softened condition.

4. The method of electric resistance welding which consists in pressing an electrode on the work at a point to be welded, and, while continuing such pressure, moving said electrode on the work to clean the surface thereof, after discontinuing such movement passing current through said electrode into said work and again moving said electrode on the work at that point while the work is in a softened condition.

5. The method of electric resistance spot welding which consists in pressing a point electrode on the work at the point to be welded, and, while continuing such pressure, rotating said electrode on the work to clean the surface thereof, after discontinuing such rotation passing current through said electrode into said work, and again rotating the electrode thereon while the work is in a softened condition.

6. In an electric resistance spot welding machine, the combination of a movable head, a point electrode carried thereby and slidable with respect thereto in substantially the direction of movement of the head, and means for rotating said electrode as it slides with respect to the head.

7. In an electric resistance spot welding machine, the combination of a head movable toward and from the work, a point electrode carried thereby and slidable with respect thereto in substantially the directions of movement of the head, a spring tending to maintain the electrode extended from the head toward the work and means for rotating the electrode as the electrode is moved against the force of the spring.

8. In an electric resistance spot welding machine, the combination of a head movable toward and from the work, a point electrode carried thereby and slidable with respect thereto in substantially the directions of movement of the head, a spring tending to maintain the electrode extended from the head toward the work and means for rotating the electrode as the electrode is moved against or by the force of the spring.

9. In an electric resistance spot welding machine, the combination of a head movable toward and from the work, an electrode carriage carried thereby and movable with respect thereto at substantially right angles to the movements of the head toward and from the work, a point electrode carried by said carriage and slidable with respect thereto in substantially the directions of movement of the head and means for rotating said electrode as it slides with respect to the carriage.

10. In an electric resistance spot welding machine, the combination of a head movable toward and from the work, an electrode carriage carried thereby and movable with respect thereto at substantially right angles to the movements of the head toward and from the work, a point electrode carried by said carriage and slidable with respect thereto in substantially the directions of movement of the head, a spring carried by said carriage tending to maintain the electrode extended from the head toward the work and means for rotating the electrode as the electrode is moved against the force of the spring.

11. In an electric resistance spot welding machine, the combination of a head movable toward and from the work, an electrode carriage carried thereby and movable with respect thereto at substantially right angles to the movements of the head toward and from the work, a point electrode carried by said carriage and slidable with respect thereto in substantially the directions of movement of the head, a spring carried by said carriage tending to maintain the electrode extended from the head toward the work and means for rotating the electrode as the electrode is moved against or by the force of the spring.

12. An electric resistance welding machine comprising the combination of a welding head, a welding electrode, a carrier therefor reciprocating through said welding head, a part of said head and a part of said electrode carrier passing therethrough being provided with coöperating screw threads, a collar adjustably attached to said electrode and engaging with said welding head, a spring connected to said collar and to said welding head tending to urge said electrode extended beyond said head, and means for moving said welding head.

In witness whereof, I have hereunto set my hand this 15th day of March, 1915.

HENRY GEISENHÖNER.

Witnesses:
BENJAMIN B. HULL,
HELEN ORFORD.